United States Patent [19]

Voeller et al.

[11] Patent Number: 5,743,503

[45] Date of Patent: Apr. 28, 1998

[54] COMPUTER SUSPENSION SYSTEM

[75] Inventors: Donald M. Voeller, Eagan; Harry C. Sweere, Minneapolis, both of Minn.

[73] Assignee: Ergotron, Inc., St. Paul, Minn.

[21] Appl. No.: 613,959

[22] Filed: Mar. 8, 1996

[51] Int. Cl.⁶ .................................................. E04G 3/00
[52] U.S. Cl. .......................... 248/284.1; 248/920
[58] Field of Search ........................ 248/284.1, 285.1, 248/286.1, 287.1, 324, 918, 920, 924, 278.1, 281.11

[56] References Cited

U.S. PATENT DOCUMENTS

| | | | |
|---|---|---|---|
| 3,417,953 | 12/1968 | Hillquist et al. | 248/284.1 |
| 4,411,402 | 10/1983 | Keller | 248/284.1 |
| 4,852,842 | 8/1989 | O'Neill | 248/284.1 |
| 5,170,975 | 12/1992 | Chadwick | 248/284.1 |
| 5,538,214 | 7/1996 | Sinila | 248/284.1 |

*Primary Examiner*—Ramon O. Ramirez
*Assistant Examiner*—Willie Berry, Jr.
*Attorney, Agent, or Firm*—Hugh D. Jaeger

[57] ABSTRACT

A video monitor suspension system including a four bar linkage arm for adjustable and positionable vertical and horizontal support of a video monitor, computer, computer keyboard, or a like structure. A weight counterbalance sliding anchor mechanism assembly adjustably compensates for various weights of a load held by an angled arm. Gas springs provide for vertical support of a four bar linkage arm. Reinforcement channels in the four bar linkage arm members provide for increased torsional rigidity of the video monitor suspension system and allow for the incorporation of lighter weight linkage arm members. A large pivot bearing assembly also provides for stability when used with an input device, such as a keyboard. Additional structure provides for the safety of the computer suspension system operator.

20 Claims, 11 Drawing Sheets

COMPUTER SUSPENSION SYSTEM

BACKGROUND OF THE INVENTION

1. Field of the Invention

The present invention is for a torsionally rigid computer suspension system, and more particularly, pertains to a computer support system incorporating supporting gas springs. A four bar linkage arm is incorporated to maintain parallel geometry of the supported computer.

2. Description of the Prior Art

Prior art support systems have not provided for movement of a computer and associated devices over a wide range of vertical and horizontal angles, used while sitting or standing, such as between an appropriate level for reading of a computer video monitor and inputting of information, as well as azimuthal positioning for a computer, monitor and keyboard.

In some applications or environments, such as in a hospital, it is important to have a wide range of movements for a computer, video monitor, and the associated equipment. In the past, video monitors, computers, and associated equipment have been fixed in one position or secured to an arm with no or very limited movement in a vertical or azimuthal direction. Movable members of the prior art suspension devices provided for possible injury producing areas where fingers were subject to injury, such as pinching.

Prior art devices, while being able to be swiveled, have included stops to prevent movement beyond certain limits; however, the limits generally were fixed, or at best, provided stop adjustability having coarse adjustments.

Prior art devices often required an inordinate amount of fastener or keeper devices and laborious fabrication techniques. Other prior art devices often have not provided adequately for personnel protection while using or adjusting the device.

Prior art devices have not proved to be suitably stable when inputting information. When using a keyboard as an input device, the suspension system would often move, bounce or sway, thereby causing operator aggravation.

Prior art devices have also provided devices which revealed a number of exposed surfaces, which required excessive amounts of time for cleaning.

Other prior art devices provided support systems which, while functional, were not aesthetically pleasing to the eye.

The present invention provides a computer suspension system which suspends a monitor or monitor support caddy with a wide latitude of movement and overcomes the disadvantages of the prior art.

SUMMARY OF THE INVENTION

The general purpose of the present invention is to provide a computer suspension system for the support of a computer, video monitor, and associated equipment.

According to one embodiment of the present invention, there is provided a computer suspension system for a computer, video monitor, keyboard, or other such associated devices, including a support bracket, a vertically aligned pivotable arm mount bracket, a four bar linkage arm attached to the pivotable arm mount bracket, a pivot bearing mount bracket attached to one end of the four bar linkage arm, and a pivot bearing assembly rotatably secured to the pivot bearing mount bracket. The four bar linkage arm between the pivotable arm mount bracket and the pivot bearing mount bracket maintains horizontal and vertical stability of the pivot bearing mount bracket and pivot bearing assembly so that a suspended load remains plumb. A weight counterbalance sliding anchor mechanism assembly secures to the arm mount bracket. Gas springs attached to the weight counterbalance sliding anchor mechanism assembly support the four bar linkage arm, the pivot bearing mount bracket, the pivot bearing assembly, and its suspended load, such as a video monitor, computer, or the like. Reinforcement channels in the four bar linkage arm provide for torsional rigidity of the computer suspension system.

One significant aspect and feature of the present invention is a computer suspension system which pivots about a vertical axis. The use of a four bar linkage arm maintains vertical orientation of a pivot bearing mount bracket containing a backlash-free and stable pivot bearing assembly to which a computer, a monitor support bracket, or caddy is secured and suspended. Gas springs are used for support of the four bar linkage arm and its load.

Another significant aspect and feature of the present invention is the use of a weight counterbalance sliding anchor mechanism assembly. An arm-down lock prevents arm runaway when a supported load, such as a video monitor, is removed from the end of the support arm.

Still another significant aspect and feature of the present invention is the minimizing of gap size between the moving four bar linkage arm, and the pivotal arm mount bracket and pivot bearing mount bracket. The incorporation of covers at the arm mount and bearing mount brackets confine the pivot pins to their respective mounting holes.

An additional significant aspect and feature of the present invention is the incorporation of a mechanical indexing structure to adjustably and incrementally provide for desired azimuthal four bar linkage arm movement.

A further significant aspect and feature of the present invention is the incorporation of reinforcement channels welded to the interiors of the four bar linkage arm top and bottom rail members, thereby providing for torsional rigidity and allowing the use of lighter weight four bar linkage arm rail members.

A still further significant aspect and feature of the present invention is the method of securing the outer ends of supportive gas cylinders, whereby pins extending through the ends of the gas cylinders forcibly engage slots in a configured bracket welded to the interior of the top rail member of the four bar linkage arm.

Other significant aspects and features of the present invention are the incorporation of oilite bearings throughout and within to provide for smooth operation of the four bar linkage arm and other members; and a pivot bearing assembly of sufficient breadth and thickness provide for torsional rigidity and stable inputting characteristics.

Having thus set forth significant aspects and features of the present invention, it is the principal object of the present invention to provide a stable computer support system for the support of a computer, video monitor, input devices, and the like, including a weight counterbalance sliding anchor mechanism, gas springs and reinforcement channels located within a four bar linkage arm.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
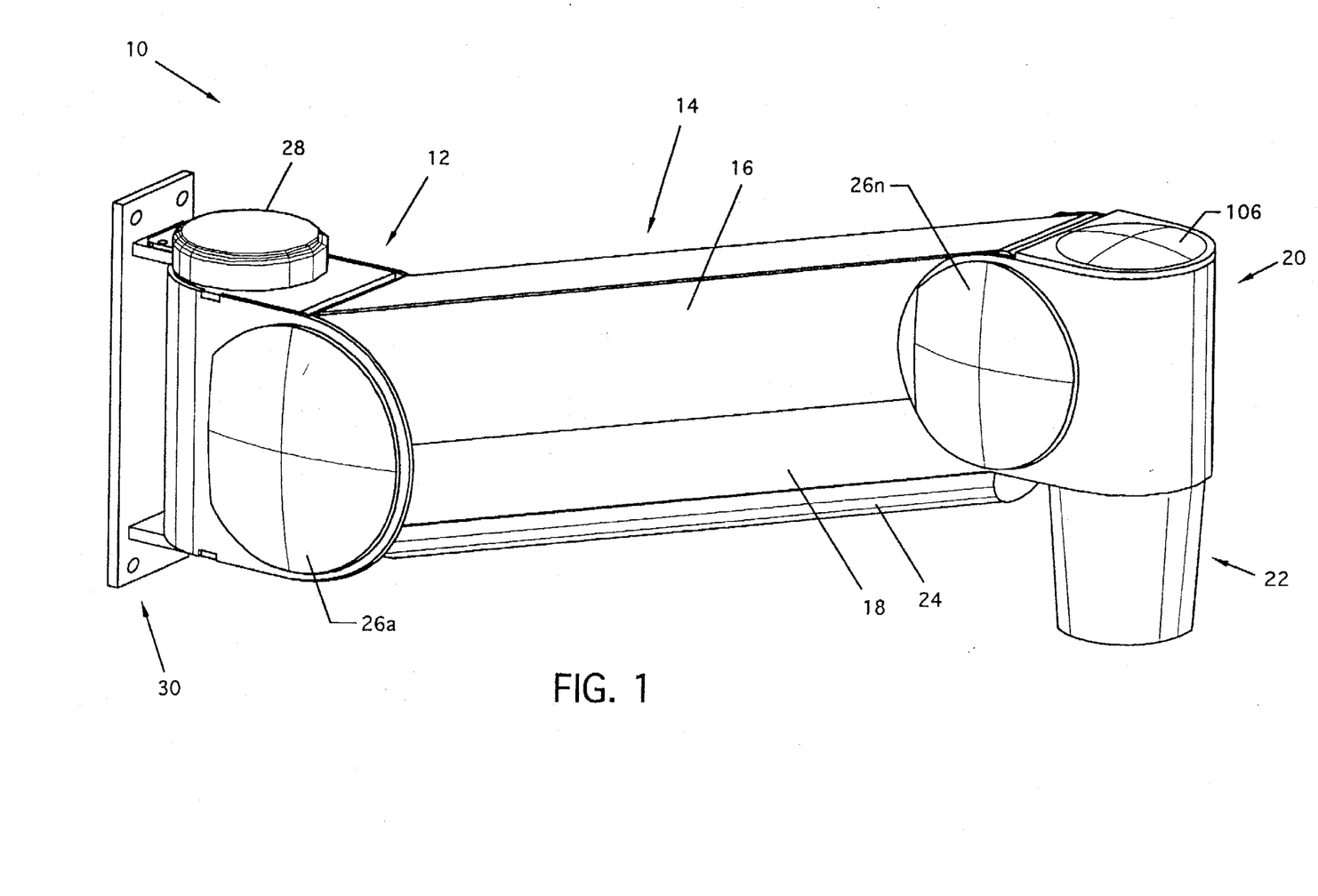
FIG. 1 illustrates a perspective view of a computer suspension system according to the present invention.

FIG. 1 illustrates a perspective view of a computer suspension system 10, the present invention, for the suspension of a monitor, computer or other like structures. Major illustrated components of the computer suspension system 10 include an arm mount bracket 12, a four bar linkage arm 14 attached to the arm mount bracket 12 having a top rail member 16 and a bottom rail member 18, a pivot bearing mount bracket 20 attached to the four bar linkage arm 14, a pivot bearing assembly 22 secured to the pivot bearing mount bracket 20, a detachable cable channel 24 secured to the bottom of the bottom rail 18, a plurality of disk-like cover caps 26a–26n and 106, having concave inner surfaces, secured to opposing sides of the arm mount bracket 12 and the pivot bearing mount bracket 20, a mechanical indexing structure cover 28, and a support bracket 30 for attachment to a track or other support system.

Figure 2:
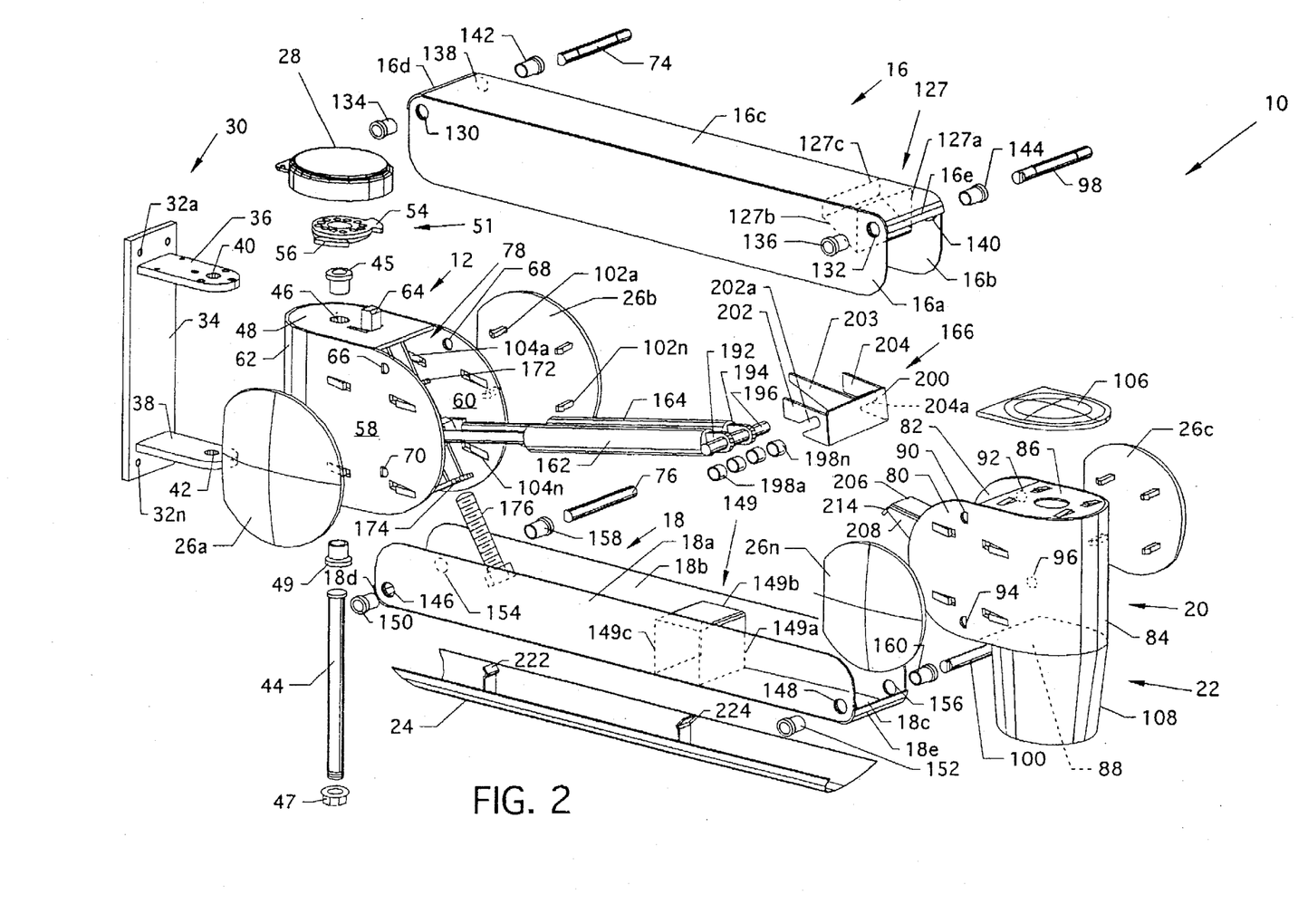
FIG. 2 illustrates an exploded view of the computer suspension system showing the majority of the component members.

FIG. 2 illustrates an exploded view of the computer suspension system 10 showing the majority of the component members, where all numerals correspond to those elements previously described.

Figure 3:
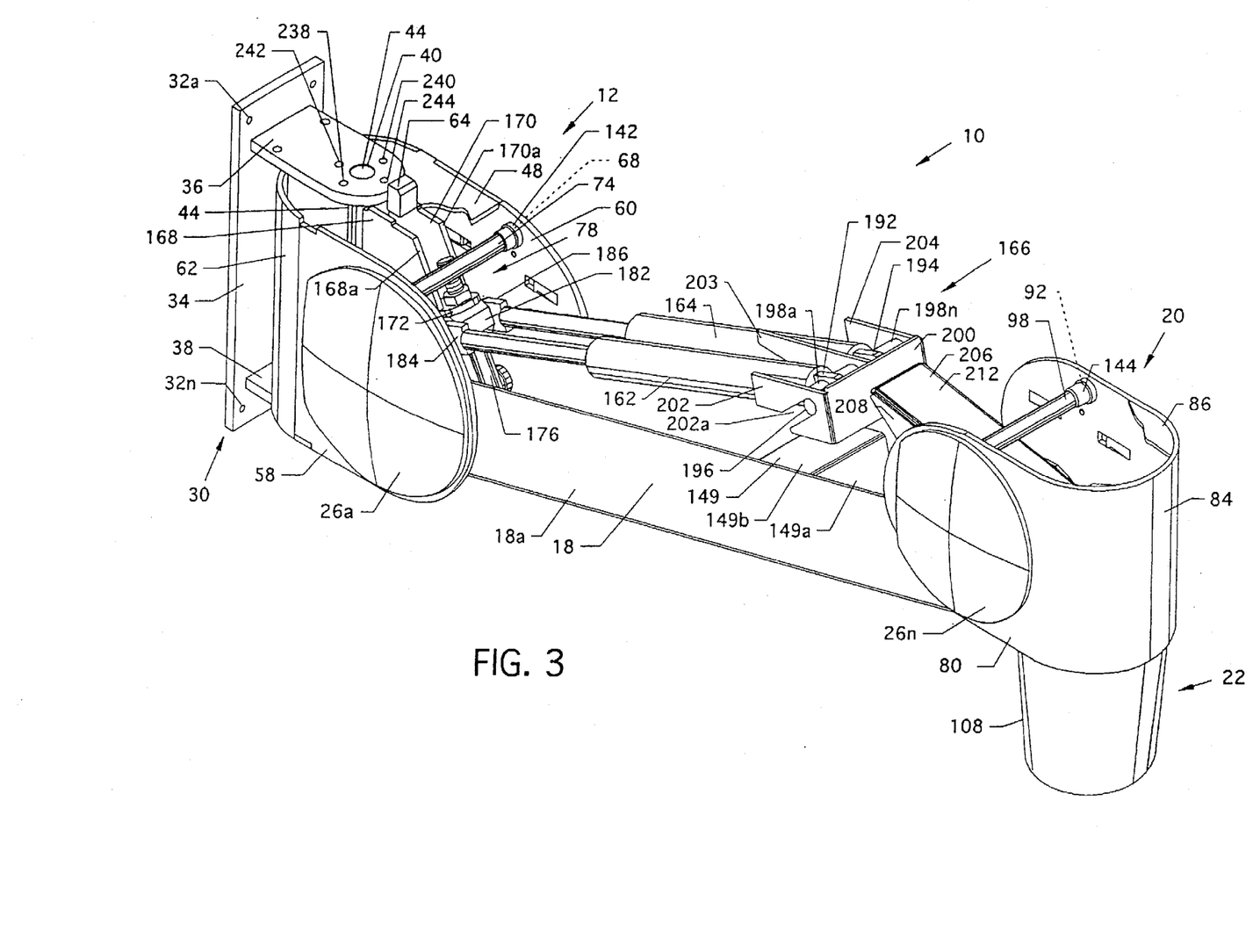
FIG. 3 illustrates an isometric cutaway view of the computer suspension system with the top rail removed.

FIG. 3 illustrates an isometric cutaway view of the computer suspension system 10 with the top rail 16 and mechanical indexing structure removed for purposes of illustration, where all numerals correspond to those elements previously described.

Figure 4:
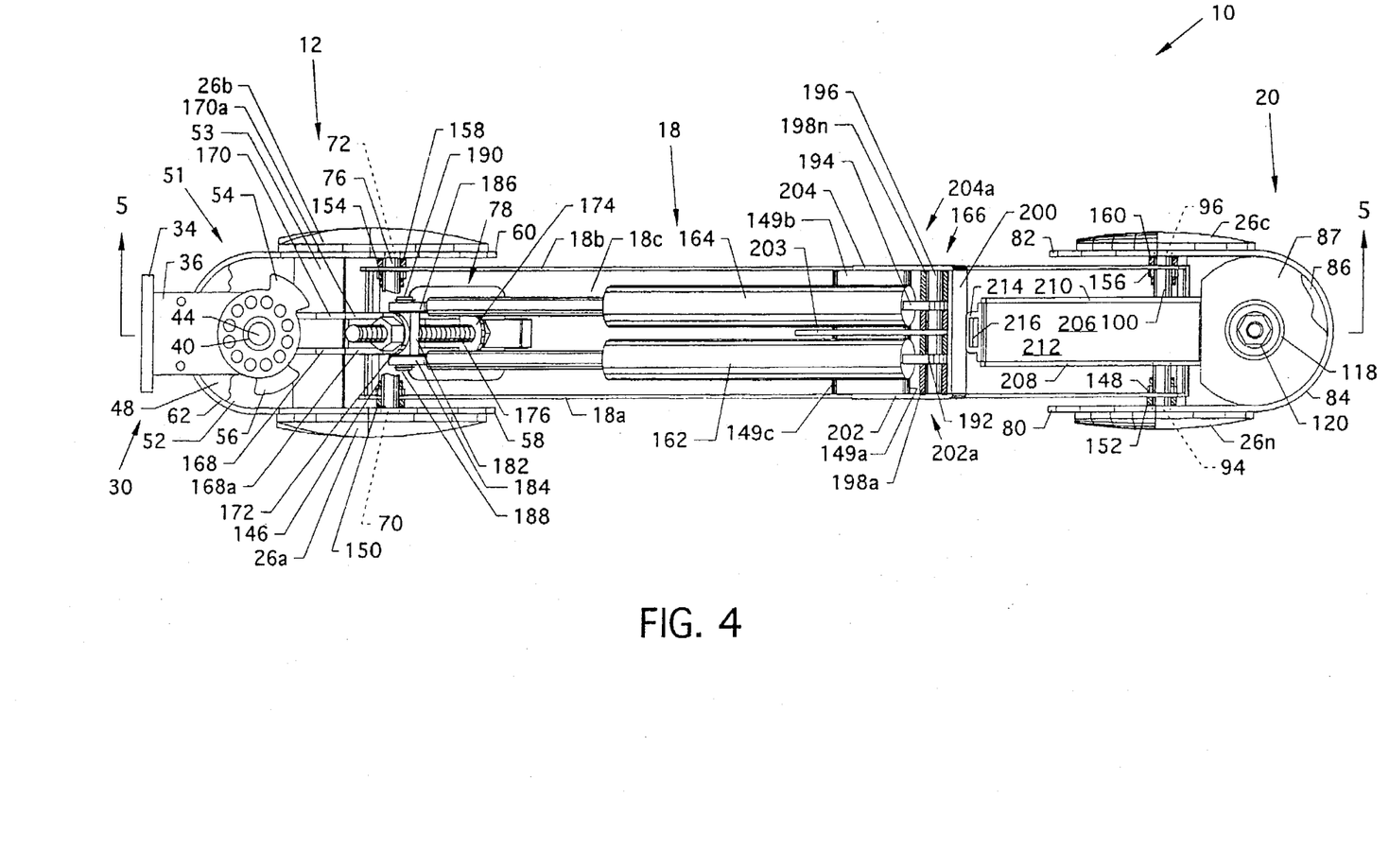
FIG. 4 illustrates a top view of the computer suspension system with the top rail removed.

FIG. 4 illustrates a top view of the computer suspension system 10 with the top rail 16, corresponding pins and oilite bearings not shown for purposes of illustration, where all numerals correspond to those elements previously described.

Figure 5:
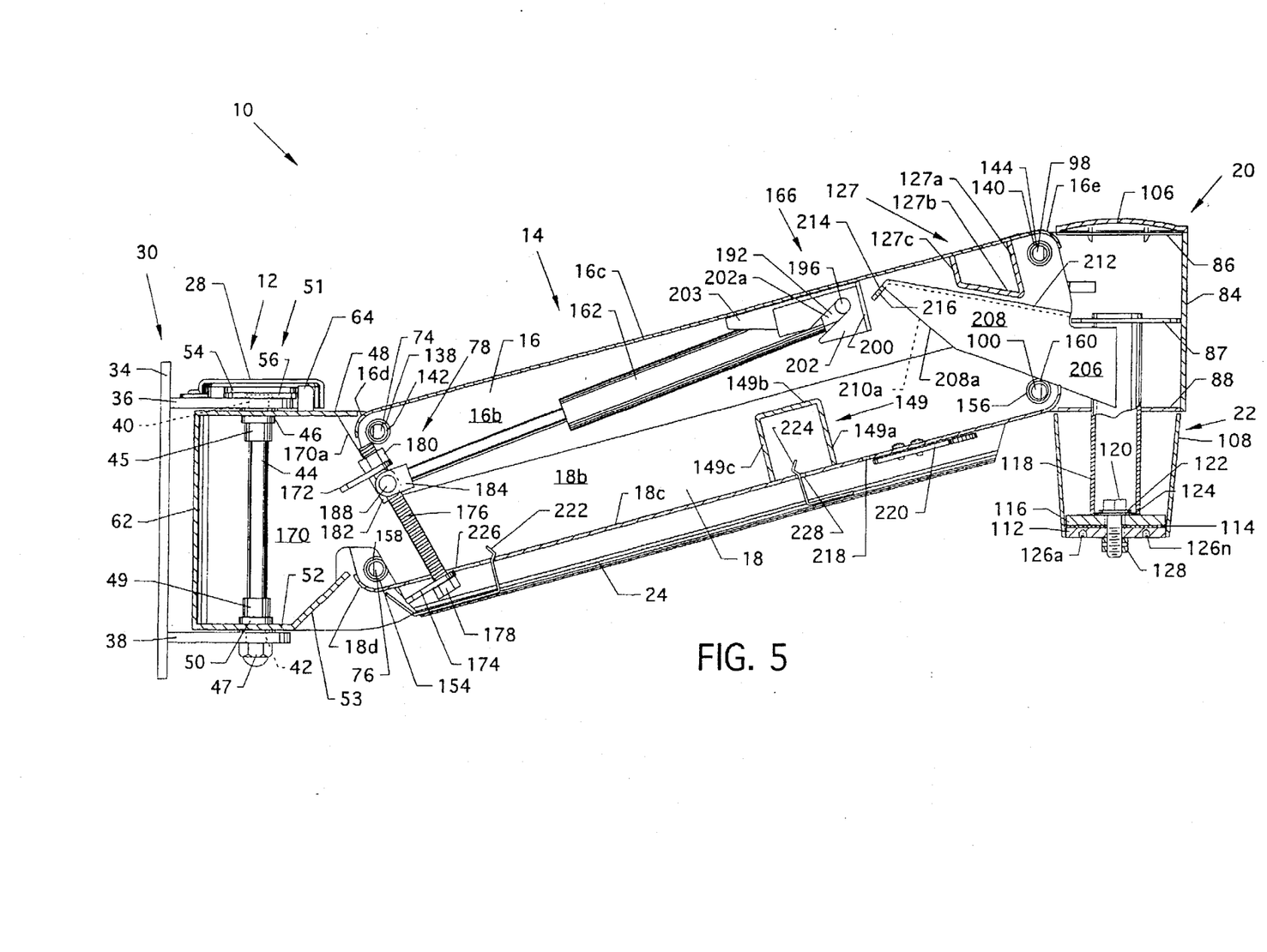
FIG. 5 illustrates a side view in cross section along line 5—5 of FIG. 4.

FIG. 5 illustrates a side view in cross section along line 5—5 of FIG. 4 of the computer suspension system 10 including the top rail 16, where all numerals correspond to those elements previously described.

With reference to FIGS. 1-5, the computer suspension system 10 is now described. The arm mount bracket 12 serves as a mount for the four bar linkage arm 14 and other associated components of the computer suspension system 10. The arm mount bracket 12 pivotally secures to the support bracket 30 which includes a plurality of mounting holes 32a–32n on vertically oriented planar bracket member 34 and opposing horizontally oriented aligned planar bracket members 36 and 38 extending from the planar bracket member 34. Support bracket 30 can slidably engage a wall track or other such suitable mounting device. A pivot pin 44, having a flanged end, secures in holes 40 and 42 in the horizontally aligned bracket members 36 and 38, respectively. Pivot pin 44 also passes and extends through an oilite bearing 45 in extruded hole 46 in an upper planar member 48 at the top portion of the arm mount bracket 12, through an oilite bearing 49 in opposing extruded hole 50 in a lower planar member 52 of the arm mount bracket 12, and into a nut 47. Adjustable stop plates 54 and 56 secure to the upper surface of the horizontally oriented planar bracket member 36 as described later in detail.

Arm mount bracket 12 includes a one piece U-shaped member having vertically aligned planar side members 58 and 60, and a curved member 62 therebetween. Arm mount bracket 12, and upper and lower planar members 48 and 52 secure to the top and lower edges of vertically aligned planar side members 58 and 60, and curved member 62, respectively. A stop 64 extends vertically from the upper planar member 48 to interact with adjustable stop plates 54 and 56, as later described in detail. Opposing holes 66 and 68 in the upper region of planar side members 58 and 60, and opposing holes 70 and 72 in the lower region of planar side members 58 and 60 accommodate pins 74 and 76, and associated oilite bearings for pivotal securement of the inboard ends of the top and bottom rails 16 and 18 to the arm mount bracket 12. One end of pins 74 and 76 includes an anti-rotational flat for engagement with corresponding flat surfaces of holes 66 and 70. A sliding anchor mechanism assembly 78, part of a weight adjustment mechanism, secures to the interior of the arm mount bracket 12, as later described in detail.

Pivot bearing mount bracket 20 includes a one-piece U-shaped member having vertically aligned planar side members 80 and 82 and a curved member 84 therebetween. Pivot bearing mount bracket 20 upper, mid and lower planar members 86, 87 and 88 secure to the top edges, mid portions and lower edges of vertically aligned planar side members 80 and 82 and curved member 84, respectively. Opposing holes 90 and 92 in the upper region of planar members 80 and 82 and opposing holes 94 and 96 in the lower region of planar side members 80 and 82 accommodate pins 98 and 100, and associated oilite bearings for securement of the outboard ends of the top and bottom rails 16 and 18 to the pivot bearing mount bracket 20. One end of pins 98 and 100 includes an anti-rotational flat for engagement with corresponding flat surfaces of holes 90 and 94.

Disk-like cover caps 26a–26n, having a concave inner surface, each including a plurality of latch barbs or hooks 102a–102n which engage similar catch tabs 104a–104n, are opposingly located in arm mount bracket 12 and pivot bearing mount bracket 20. A similar arrangement secures a cover cap 106 to the upper planar member 86 of the pivot bearing mount bracket 20.

Pivot bearing assembly 22 extends downwardly from the pivot bearing mount bracket 20 to pivotally support a computer and/or its peripheral components such as a CPU, monitor, keyboard and the like. A truncated conical member 108 aligns beneath the lower planar member 88 of the pivot bearing mount bracket 20 and houses a large pivot bearing having a rotatable heavy disk member 112, a nylon washer 114, a positionally fixed heavy disk member 116, all aligned in stacked fashion, a vertically aligned tubular member 118 suitably secured, such as by welding, to the positionally fixed heavy disk member 116, a Keps bolt 120 extending through a flat steel washer 122, an oilite thrust bearing washer 124, the positionally fixed heavy disk 116, the nylon washer 114, the rotatable heavy disk 112 and into a secured internally threaded member 128 having a plurality of set screws for compressional tightening against the shaft of the Keps bolt 120. Rotatable heavy disk 112 includes a threaded center hole which threadingly engages Keps bolt 120. The internally threaded member 128 ensures secure engagement of the Keps bolt 120 to the heavy rotatable disk 112 as well as compressional force across the bearing members. Tubular member 118 weldingly secures centrally in mid planar member 87 and lower planar member 88. A plurality of holes 126a–126n in the bottom surface of the heavy rotatable disk 112 accommodate mounting screws for a computer, caddy or other attached device. The use of wide and heavy disk members 116 and 112 provides for rigidity when inputting information to an on-board keyboard.

The four bar linkage arm 14, including reinforced top rail 16 and reinforced bottom rail 18, pivotally secures between the arm mount bracket 12 and the pivot bearing mount bracket 20. The reinforced top rail 16 includes opposed vertically oriented planar side members 16a and 16b with a horizontally aligned planar top member 16c, having curved end portions 16d and 16e, aligned between the vertically oriented side members 16a and 16b. A configured reinforcement channel 127 including planar sidewall members 127a, 127b and 127c aligns and secures, such as by welding along all edges, to one or more of planar side members 16a and 16b, and planar top member 16c, respectively. Sidewall member 127b is angled with respect to sidewall members 127a and 127c, and serves as a stop for a stop arm 206 for limiting the upward travel of the four bar linkage arm 14. Reinforcement channel 127 lends structural integrity and support to promote torsional rigidity of the top rail members with respect to each other as well as to the computer suspension system 10. Extruded holes 130 and 132 are located in the upper region of planar side member 16a and frictionally engage oilite bearings 134 and 136, respectively. Extruded holes 138 and 140 are located in the upper region of planar side member 16b and frictionally engage oilite bearings 142 and 144, respectively. The left end of the top rail 16 aligns between the planar side members 58 and 60 of the arm mount bracket 12. Pin 74, one end of which has a flat, aligns through oilite bearings 134 and 142 in extruded holes 130 and 138, respectively, of the top rail 16, and also through holes 66 and 68, respectively, in the upper region of the arm mount bracket 12 to pivotally secure one end of the top rail 16 to the arm mount bracket 12. In a similar fashion, the right end of the top rail 16 aligns between the planar side members 80 and 82 of the pivot bearing mount bracket 20. Pin 98, one end of which has a flat, aligns through oilite bearings 136 and 144 in extruded holes 132 and 140, respectively, of the top rail 16 and also through holes 90 and 92, respectively, in the upper region of the arm mount bracket 12 to pivotally secure the remaining end of the top rail 16 to the arm mount bracket 12.

The bottom rail 18, being of less width than the top rail 16, aligns generally and partially within the vertical side members 16a and 16b of the top rail 16. The bottom rail 18 includes opposed vertically oriented planar side members 18a and 18b with a horizontally aligned planar bottom member 18c, having curved end portions 18d and 18e, aligned between the vertically aligned side members 18a and 18b. A configured reinforcement channel 149 including planar sidewall members 149a, 149b and 149c aligns and secures, such as by welding along all edges, to one or more of planar side members 18a and 18b, and planar bottom member 18c, respectively. Reinforcement channel 149 lends structural integrity and support to promote torsional rigidity of the members of bottom rail 18 with respect to each other as well as to the computer suspension system 10. Extruded holes 146 and 148 are located in the lower region of planar side member 18a and frictionally engage oilite bearings 150 and 152, respectively. Extruded holes 154 and 156 are located in the lower region of planar side member 18b and frictionally engage oilite bearings 158 and 160, respectively. The left end of the bottom rail 18 aligns between planar side members 16a and 16b of the top rail 16, as well as between the planar side members 58 and 60 of the arm mount bracket 12. Pin 76, one end of which has a flat, aligns through oilite bearings 150 and 158 in extruded holes 146 and 154 of the bottom rail 18 and also through holes 70 and 72 in the lower region of the arm mount bracket 12, respectively, to pivotally secure one end of the bottom rail 18 to the arm mount bracket 12. In a similar fashion, the right end of the bottom rail 18 aligns between the planar side members 16a and 16b of the top rail 16, as well as between planar side members 80 and 82 of the pivot bearing mount bracket 20. Pin 100, one end of which has a flat, aligns through oilite bearings 152 and 160 in extruded holes 148 and 156 of the bottom rail 18, and also through holes 94 and 96 in the lower region of the pivot bearing mount bracket 20 to pivotally secure the remaining end of the bottom rail 18 to the pivot bearing mount bracket 20.

Gas springs 162 and 164 secure between the sliding anchor mechanism assembly 78, which is housed and secured within arm mount bracket 12, and a configured bracket 166 weldingly secured between the planar side members 16a and 16b, and the planar top member 16c of the top rail 16. The sliding anchor mechanism assembly 78 includes vertically aligned plate members 168 and 170 having inclined edge surfaces 168a and 170a, respectively, upper and lower brackets 172 and 174 aligned and secured between the plate members 168 and 170, a threaded bolt 176 passing through body holes in upper and lower brackets 172 and 174, an adjustment bolt head 178 at one end of threaded bolt 176, a nut 180 permanently attached to the upper end of the threaded bolt 176, and a sliding attachment member 182 which threadingly engages threaded bolt 176 and which also aligns to and slides along inclined edge surfaces 168a and 170a. Plate members 168 and 170 secure, such as by welding, between upper and lower planar members 48 and 52 of the arm mount bracket 12 and along an angled planar member 53 extending from the lower planar member 52. The inboard ends 184 and 186 of the gas springs 162 and 164 secure to pivot posts 188 and 190 at the sides of the sliding attachment member 182 illustrated in FIG. 7.

The outboard ends 192 and 194 of the gas springs 162 and 164, respectively, secure over and about a pivot pin 196. Spacers 198a–198n align over and about pivot pin 196 to maintain spacing of the outboard gas spring ends 192 and 194 along the pivot pin 196. Pivot pin 196 aligns to the configured bracket 166, as later described in detail, and is held in place laterally across the configured bracket 166 by opposing sidewall members 16a and 16b of the top rail 16. The configured bracket 166 includes a vertically aligned central main planar member 200, opposing vertically aligned planar receptacle members 202 and 204 aligned perpendicularly to the main planar member 200, and a vertically aligned planar member 203 extending from the main planar member 200. The upper edges of planar members 202, 203 and 204 are secured, such as by welding, to one or more of the inner surfaces of planar side members 16a and 16b, and planar top member 16c to serve as a structural support member in the upper region of the top rail 16. Angled slots 202a and 204a are located along planar receptacle members 202 and 204, respectively, to accommodate the ends of pivot pin 196 which are, by the outward tension of the gas springs 162 and 164, forced fully into the angled slots 202a and 204a. Fabrication of the assembly with respect to anchoring of gas spring ends is simplified, as no fasteners such as snap rings, clips, bolts, washers, and the like are incorporated at the outboard end of the gas springs 162 and 164.

A stop arm 206 having side members 208 and 210, a top member 212, an extension 214 extending from the top member 212, and a rectangular hole 216 central to the extension 214, aligns and secures to the tubular member 118 of the pivot bearing mount bracket 20. The ends of side members 208 and 210 secure over and along the tubular member 118. Upon full downward positioning of the four bar linkage arm 14, angled edges 208a and 210a of side members 208 and 210 come in contact with bottom member 18c of the bottom rail 18 to limit the downward travel of the four bar linkage arm 14. Extension 214 passes through a hole 218 in the bottom member 18c. A locking slide bar 220 can be positioned to extend through the rectangular hole 216 in the end of the extension 214 to lock the four bar linkage arm in the down position.

Detachable cable or wiring management channel 24 includes spring latches 222 and 224 which engage a rectangular hole 226 and a hole 228 in bottom member 18c of the bottom rail 18.

Figure 6:
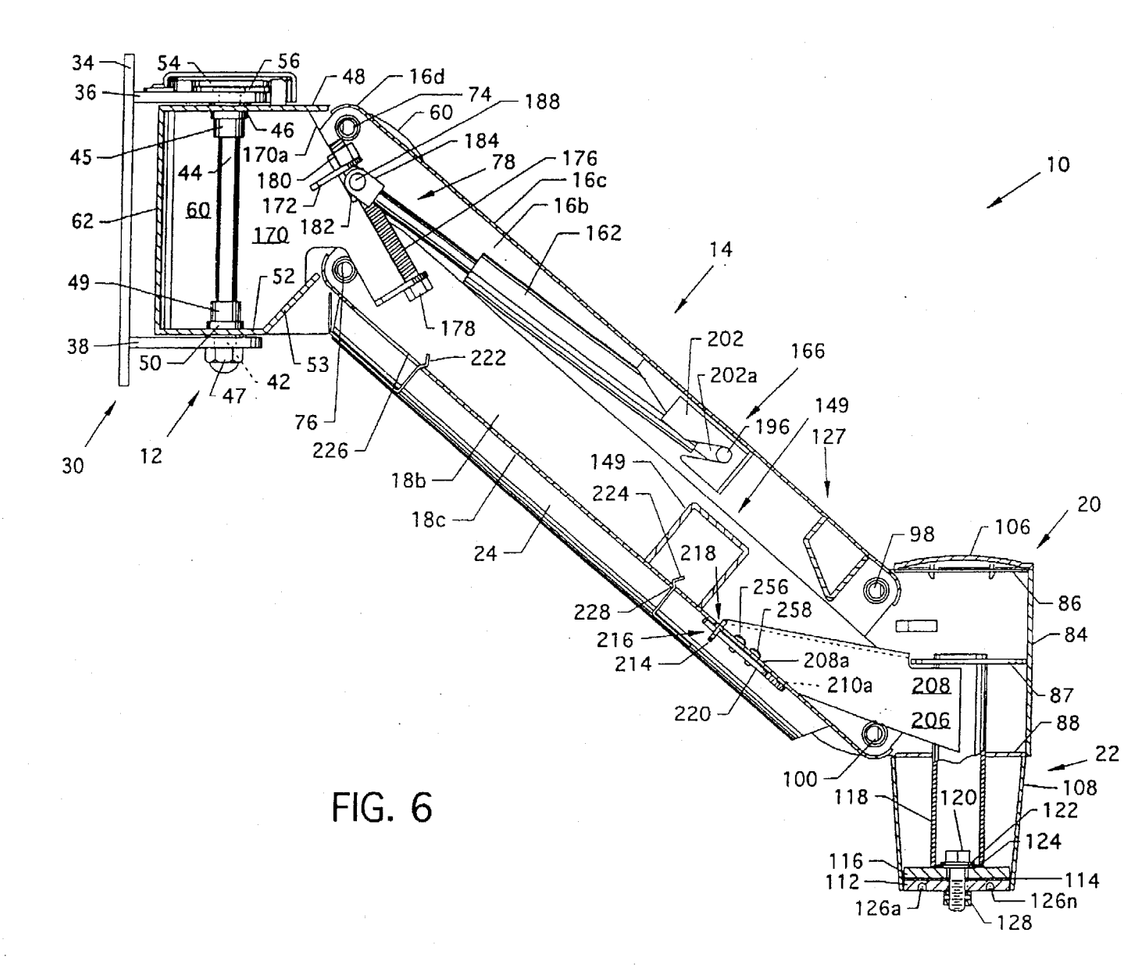
FIG. 6 illustrates a cutaway side view of the computer suspension system of FIG. 5 in the down and locked position.

FIG. 6 illustrates a cutaway side view of the computer suspension system 10 in the full down and locked position. Illustrated in particular is the locking of the four bar linkage arm 14 in the down position for loading or unloading of a monitor, computer and input devices. As the four bar linkage arm 14 positions in the full down position, edges 208a and 210a of the stop arm 206 contact the planar bottom member 18c of the bottom rail 18 to limit the downward movement of the four bar linkage arm 14 and also to prevent over extension of the gas springs 162 and 164. Simultaneously, the extension 214, part of the stop arm 206, is positioned through hole 218 in the planar bottom member 18c. The slide bar 220 is then slidingly positioned along fasteners 256 and 258 to engage the rectangular hole 216 in the extension 214, thus locking the four bar linkage arm 14 in the full down position.

Figure 7:
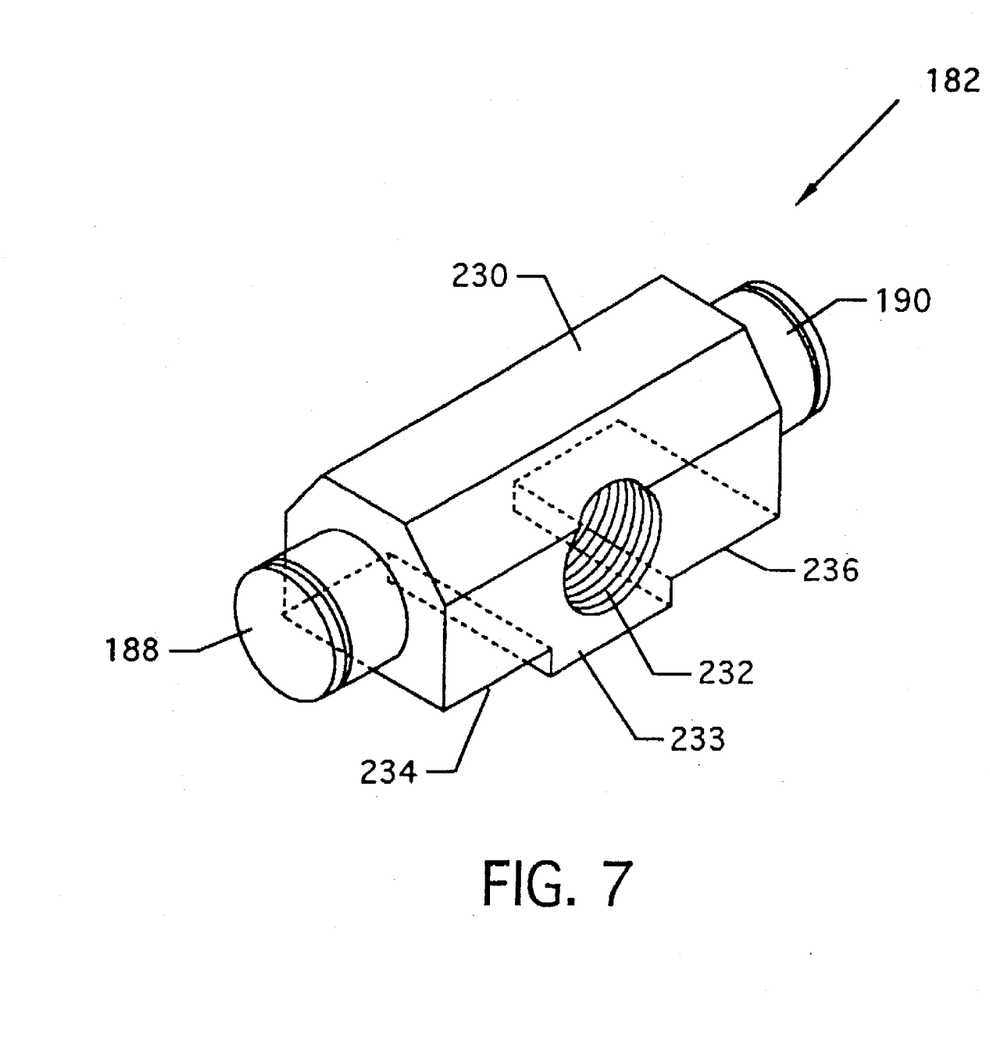
FIG. 7 illustrates an isometric view of the sliding attachment member.

FIG. 7 illustrates an isometric view of the sliding attachment member 182 where all numerals correspond to those elements previously described. The sliding attachment member 182 includes a body 230, grooved pivot posts 188 and 190 extending outwardly from the ends of the body 230, a threaded hole 232 aligned through the body 230, and a member 233 extending downwardly from the body 230 to define opposing bottom planar members 234 and 236 shown in dashed lines. Bottom planar members 234 and 236 slide along inclined edge surfaces 168a and 170a of the sliding anchor mechanism assembly 78 illustrated in the previous FIGS.

Figure 8:
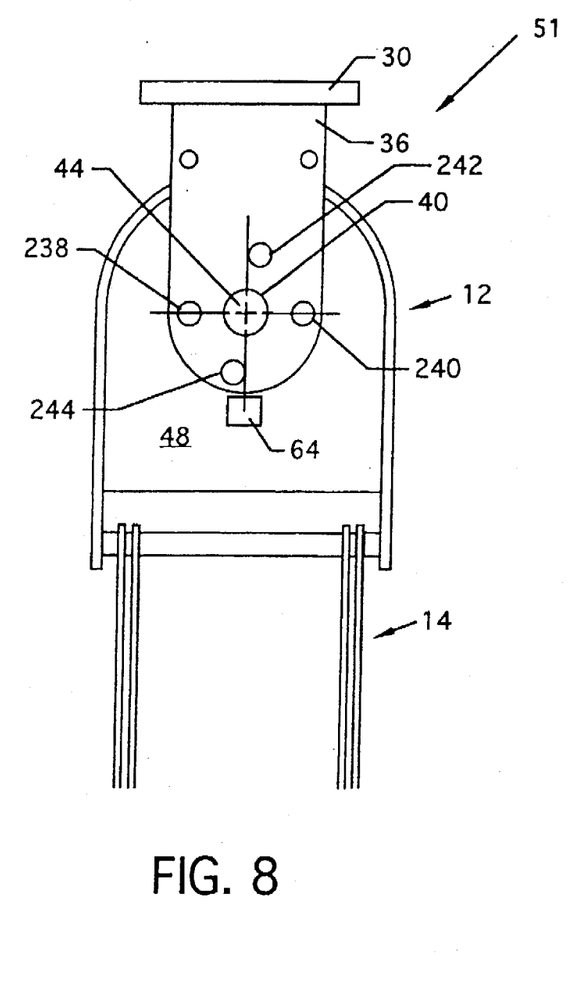
FIG. 8 illustrates a top view of the arm mount bracket and support bracket showing the placement of opposing threaded hole sets on the horizontally oriented planar bracket member.
Figure 9:
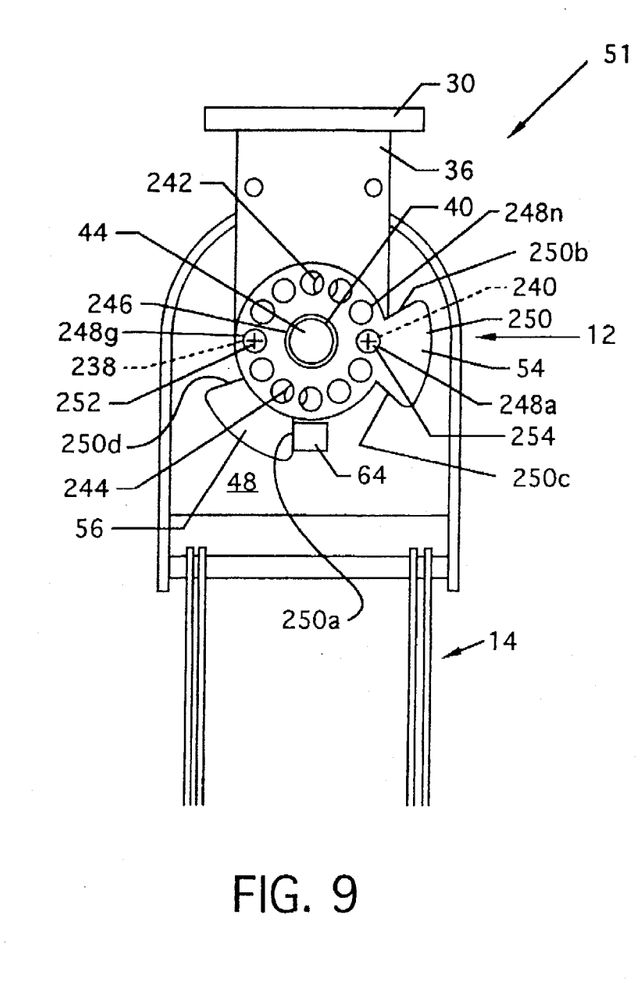
FIG. 9 illustrates a top view similar to FIG. 8 and showing the stop plates as aligned and secured to one set of opposing securement holes.
Figure 10:
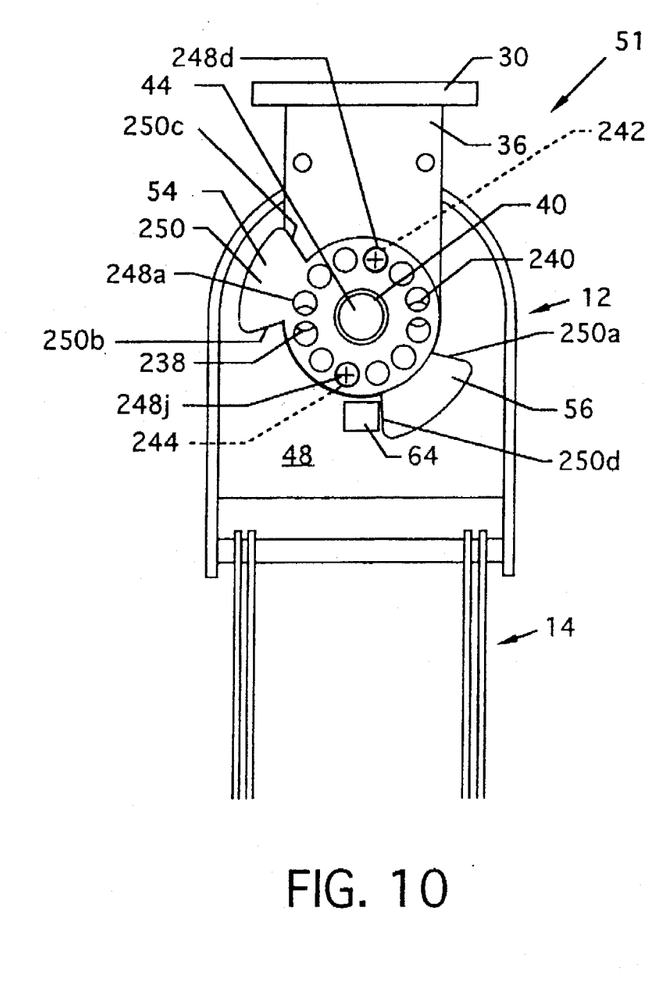
FIG. 10 illustrates a top view similar to FIG. 9, but showing the stop plates as aligned to another set of opposing securement holes; and, FIG. 11 illustrates a side view of the computer suspension system illustrating the vertical range of travel of the computer suspension system.

FIGS. 8, 9 and 10 illustrate the mechanical indexing structure 51 in various stages of assembly and usage where all numerals correspond to those elements previously described.

FIG. 8 illustrates the placement of opposing threaded hole sets aligned about hole 40 on the horizontally oriented planar bracket member 36. One set of threaded holes includes opposing threaded holes 238 and 240; and another threaded hole set includes opposing threaded holes 242 and 244. Hole set usage and orientation of adjustable stop plates 54 and 56 determines the amount of incremental adjustment of the adjustable stop plates 54 and 56 as illustrated in FIGS. 9 and 10. Holes 238 and 240 are opposingly located at the 3 o'clock and 9 o'clock positions, with reference to the center of hole 40, and holes 242 and 244 are opposingly positioned 15° clockwise from the 12 o'clock and the 6 o'clock positions with reference to the center of the hole 40.

FIG. 9 illustrates stop plates 54 and 56 aligned to opposing holes 238 and 240 of the horizontally oriented planar bracket member 36. Stop plates 54 and 56 are identically constructed and are interchangeable members. Stop plate 54 includes a centrally located hole 246, a plurality of holes 248a–248n aligned at a constant radius about the hole 246, and, a configured stop tab 250 extending outwardly from the circumferential periphery. The opposing stop tab surfaces 250b and 250c of stop tab 250 are offset to each other with regard to the respective adjacent holes 248a–248n to allow fine incremental adjustment. Screws 252 and 254 are illustrated passing through holes 248g and 248a of the adjustable top located stop plate 54 and selected holes in the lower stop plate 56 to positionally fix the stop plates 54 and 56 with respect to the horizontally oriented planar bracket member 36. Arm mount bracket 12 and the attached four bar linkage arm 14 can be swung unimpeded until the stop 64 extending vertically from the arm mount bracket 12 is contacted by either stop tab surface 250c of the upper adjustable stop plate 54 or stop tab surface 250a of the lower adjustable stop plate 56, as illustrated. The adjustable stop plates 54 and 56 can, for purposes of illustration, be positioned in 30° increments about their centers with reference to holes 238 and 240. 30° incremental adjustment to intermediate points can be made utilizing holes 242 and 244, which effectively yields 15° incremental adjustment, and, flipping over of the stop plates 54 and 56 as a pair produces another offset with respect to the effective 15° incremental adjustment to provide an additional 7.5° incremental adjustment.

FIG. 10 illustrates repositioning of the stop plates 54 and 56 where their position is secured using holes 242 and 244 in the horizontally oriented planar bracket member 36. The arm mount bracket 12 is free to be swung unimpeded in a counterclockwise direction until stop 64 comes in contact with stop tab surface 250b of adjustable top stop member 54, or in the reverse direction until the stop 64 contacts the stop tab surface 250d of the bottom adjustable stop member 56, as illustrated.

Figure 11:
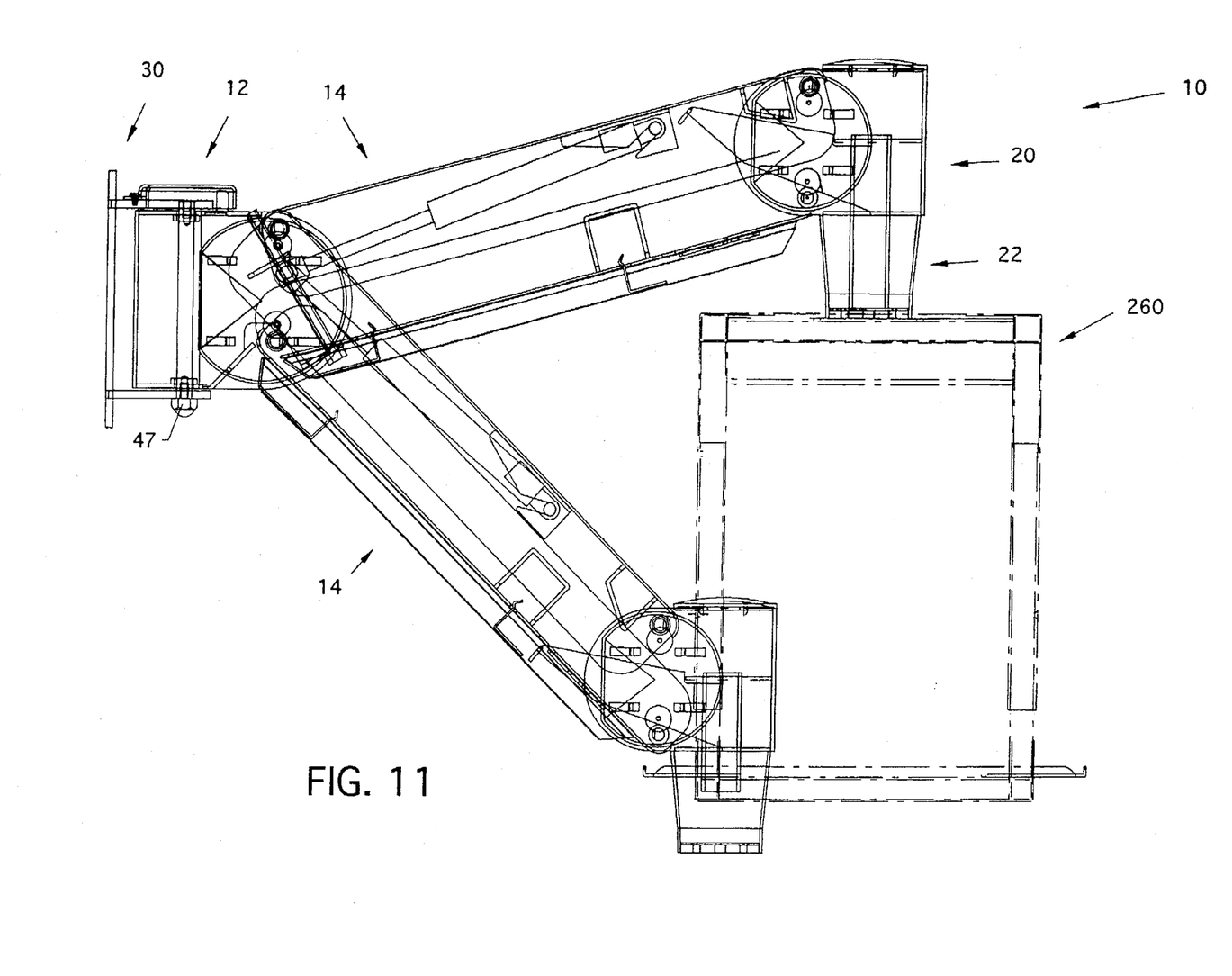

FIG. 11 illustrates the range of vertical adjustment of computer suspension system 10, where all numerals correspond to those elements previously described. A caddy 260 for carriage of a computer, monitor, input or other like devices is attached to the pivot bearing assembly 22.

MODE OF OPERATION

FIG. 6 illustrates the four bar linkage arm 14 in the full down position whereby the extension 214 of the stop arm 206 has passed through the hole 218 in the planar bottom member 18c of bottom rail 18 and has been engaged by the positionable slide bar 220, and is shown locked such as for loading or unloading of a payload, such as a video monitor, into a caddy attached to the pivot bearing assembly 22. The positionable slide bar 220 slidably engages hole 216 in the end of the extension 214 for locking purposes.

The angle of inclined edge surfaces 168a and 170a provides a linear positioning force over the entire vertical adjustment range of the four bar linkage arm 14 over a load weight counterbalance range of 25–100 pounds by way of example. Threaded bolt 176 is adjusted by rotating the adjustable bolt head 178 to operate the sliding attachment member 182 along the edge surfaces 168a and 170a in a screw-jack fashion. This adjustment positions the moveable ends 184 and 186 of the gas springs 162 and 164 to appropriately tension the four bar linkage arm assembly 14 with respect to the payload secured at pivot bearing assembly 22. The angle of inclined edge surfaces 168a and 170a is designed to provide linear control of the payload suspended by the four bar linkage arm 14 throughout the range. Full upper and lower arm adjustment within the full range of load capacity adjustment is offered by sliding attachment member 182. Incorporation of the upper reinforcement channel 127 as a stop when the four bar linkage arm 14 is positioned in the full upward position ensures that angled pin 196 has not disengaged the slots 202a and 204a. Another derived benefit is that over-travel of gas springs 162 and 164 is prevented by the upper reinforcement channel 127 which sets the upper limit stop point, thus allowing the full hydrolift capabilities of the gas springs 162 and 164 to be utilized. The hydrolift features allow stable positioning of the payload at any desired level. Once positioned at the desired height, the payload will stay at the desired height even if the operator bumps, or swivels, the monitor. A nominal force is required to move the monitor from one height to another. The last position of the positionable four bar linkage arm 14 creates a momentary positionable memory for the present position, and the positioned arm will tend to remain in that memory position until operator force resets the memory by forcibly repositioning the four bar linkage arm 14. Little or slight force is required to reposition the four bar linkage arm 14 due to the counterbalancing or to overcome the momentary memory position. Reinforcement channel 127 and reinforcement channel 149, being weldingly secured along all appropriate edges to the top rail 16 and the bottom rail 18, respectively, lend to torsional rigidity of the computer suspension system 10. Also, adding to the overall rigidity and structural stability, especially during keyboard inputting, is the heavy and largely proportioned components of the pivot bearing assembly 22. The unique mechanical indexing structure 51 provides for small incremental adjustment stops for limiting azimuthal positioning of the four bar linkage arm 14.

Operator enhancement is considered in the design of the computer suspension system 10. Closely spaced gaps, such as the gap between the curved end 16d of the top rail 16 and the inwardly facing edge of the upper planar member 48, prevent injuries to fingers of the operator. The elimination of external-like stop members also minimizes personal injury. The elimination of external-like stop members, as found in prior art devices, which typically could be located in the vicinity of the support bracket 30 and the arm mount bracket 12, also reduces the number of hazardous areas. A rounded smooth surface, such as arm mount 12 curved surface 62, minimizes the possibility of pinching one's fingers between the curved surface 62 and the support bracket 30. Consequently, the system enhances operator safety.

Various modifications can be made to the present invention without departing from the apparent scope hereof.

| COMPUTER SUSPENSION SYSTEM PARTS LIST | |
|---|---|
| 10 | computer suspension system |
| 12 | pivotable arm mount bracket |
| 14 | four bar linkage arm |
| 16 | top rail |
| 16a–b | planar side members |
| 16c | planar top member |
| 16d–e | curved ends |
| 18 | bottom rail |
| 18a–b | planar side members |
| 18c | planar bottom member |
| 18d–e | curved ends |
| 20 | pivot bearing mount bracket |
| 22 | pivot bearing assembly |
| 24 | cable channel |
| 26a–n | cover caps |
| 28 | mechanical indexing structure cover |
| 30 | support bracket |
| 32a–n | mounting holes |
| 34 | vertically oriented planar bracket member |
| 36 | horizontally oriented planar bracket member |
| 38 | horizontally oriented planar bracket member |
| 40 | hole |
| 42 | hole |
| 44 | pivot pin |
| 45 | oilite bearing |
| 46 | extruded hole |
| 47 | nut |
| 48 | upper planar member |
| 49 | oilite bearing |
| 50 | extruded hole |
| 51 | mechanical indexing structure |
| 52 | lower planar member |
| 53 | angled planar member |
| 54 | adjustable stop plate |
| 56 | adjustable stop plate |
| 58 | planar side member |
| 60 | planar side member |
| 62 | curved member |
| 64 | stop |
| 66 | hole |
| 68 | hole |
| 70 | hole |
| 72 | hole |
| 74 | pin |
| 76 | pin |
| 78 | sliding anchor mechanism assembly |
| 80 | planar side member |
| 82 | planar side member |
| 84 | curved member |
| 86 | upper planar member |
| 87 | mid planar member |
| 88 | lower planar member |
| 90 | hole |
| 92 | hole |
| 94 | hole |
| 96 | hole |
| 98 | pin |

-continued

COMPUTER SUSPENSION SYSTEM PARTS LIST

| | |
|---|---|
| 100 | pin |
| 102a–n | latch barbs or hooks |
| 104a–n | catch tabs |
| 106 | cover cap |
| 108 | truncated conical member |
| 112 | rotatable heavy disk |
| 114 | nylon washer |
| 116 | fixed heavy disk |
| 118 | tubular member |
| 120 | bolt |
| 122 | flat steel washer |
| 124 | oilite thrust bearing washer |
| 126a–n | holes |
| 127 | reinforcement channel |
| 127a–c | sidewall members |
| 128 | lock nut |
| 130 | extruded hole |
| 132 | extruded hole |
| 134 | oilite bearing |
| 136 | oilite bearing |
| 138 | extruded hole |
| 140 | extruded hole |
| 142 | oilite bearing |
| 144 | oilite bearing |
| 146 | extruded hole |
| 148 | extruded hole |
| 149 | reinforcement channel |
| 149a–c | sidewall members |
| 150 | oilite bearing |
| 152 | oilite bearing |
| 154 | extruded hole |
| 156 | extruded hole |
| 158 | oilite bearing |
| 160 | oilite bearing |
| 162 | gas spring |
| 164 | gas spring |
| 166 | configured bracket |
| 168 | plate member |
| 168a | inclined edge surface |
| 170 | plate member |
| 170a | inclined edge surface |
| 172 | upper bracket |
| 174 | lower bracket |
| 176 | threaded bolt |
| 178 | adjustment bolt head |
| 180 | nut |
| 182 | sliding attachment member |
| 184 | inboard gas spring end |
| 186 | inboard gas spring end |
| 188 | pivot post |
| 190 | pivot post |
| 192 | outboard gas spring end |
| 194 | outboard gas spring end |
| 196 | pivot pin |
| 198a–n | spacers |
| 200 | main planar member |
| 202 | planar receptacle member |
| 202a | angled slot |
| 203 | planar member |
| 204 | planar receptacle member |
| 204a | angled slot |
| 206 | stop arm |
| 208 | side member |
| 208a | angled edge |

-continued

COMPUTER SUSPENSION SYSTEM PARTS LIST

| | |
|---|---|
| 210 | side member |
| 210a | angled edge |
| 212 | top member |
| 214 | extension |
| 216 | rectangular hole |
| 218 | rectangular hole |
| 220 | slide bar |
| 222 | spring latch |
| 224 | spring latch |
| 226 | rectangular hole |
| 228 | hole |
| 230 | body |
| 232 | threaded hole |
| 233 | member |
| 234 | bottom planar member |
| 236 | bottom planar member |
| 238 | threaded hole |
| 240 | threaded hole |
| 242 | threaded hole |
| 244 | threaded hole |
| 246 | hole |
| 248a–n | holes |
| 250 | stop tab |
| 250a–d | stop tab surface |
| 252 | screw |
| 254 | screw |
| 256 | fastener |
| 258 | fastener |
| 260 | caddy |

I claim:

1. A suspension system for providing stable support and movement to a computer component comprising:
   a. a support bracket attachable to mounting surface;
   b. a pivotable arm mount bracket pivotally attached to said support bracket for providing an azimuthal pivoting adjustment comprising:
      (1) a threaded bolt attached to said pivotable arm mount bracket at an angle; and,
      (2) a sliding member that threadingly engages said threaded bolt, said sliding member comprising a pivot;
   c. a four bar linkage with an inboard end and an outboard end, said inboard end attached to said pivotable arm mount bracket, said four bar linkage providing for vertical adjustment of said outboard end of said four bar linkage;
   d. a pivot bearing mount bracket attached to said outboard end of said four bar linkage;
   e. a pivot bearing assembly that rotatingly attaches to said pivot bearing mount bracket providing rotational movement about a vertical axis, said pivot bearing assembly being attached to the computer component; and,
   f. a first gas spring with an inboard end and an outboard end, said inboard end being attached to said pivot of said sliding member and said outboard end being attached to said four bar linkage.

2. The device of claim 1, wherein said angle of said threaded bolt provides a uniform counterbalancing force to support the computer component through the entire vertical adjustment range of said four bar linkage.

3. The device of claim 2, wherein said counterbalancing force allows the computer component to be repositioned with a force that is less than the weight of the computer component.

4. The device of claim 1, wherein said pivotable arm mount bracket further comprises a mechanical indexing structure to provide for incremental azimuthal adjustment.

5. The device of claim 1, wherein said four bar linkage comprises a top rail and a bottom rail, each rail with an inboard end and an outboard end, said inboard ends of said top and bottom rails being attached to said pivotable arm mount bracket and said outboard ends of said top and bottom rails being attached to said pivot bearing mount bracket.

6. The device of claim 5, wherein a slide bar engages said stop arm, thereby locking said four bar linkage in a full down position.

7. The device of claim 5, wherein said outboard end of said first gas spring is pivotally connected to said top rail.

8. The device of claim 5, wherein a stop arm attached to said pivot bearing mount bracket extends through a rectangular hole in said bottom rail to provide a limit to the downward movement of said four bar linkage.

9. The device of claim 5, wherein a sidewall member attached to said top rail provides contact with a stop arm to limit upward movement of said four bar linkage.

10. The device of claim 1, wherein said sliding member engages said threaded bolt at a location along said threaded bolt to support the computer component.

11. The device of claim 1, further comprising a second gas spring positioned parallel to said first gas spring with an inboard end and an outboard end, said inboard end being attached to said pivot of said sliding member and said outboard end being attached to said four bar linkage.

12. The device of claim 11, wherein said four bar linkage comprises a top rail and a bottom rail, each rail with an inboard end and an outboard end, said inboard ends of said top and bottom rails being attached to said pivotable arm mount bracket and said outboard ends of said top and bottom rails being attached to said pivot bearing mount bracket.

13. The device of claim 12, wherein said outboard ends of said first and second gas springs are pivotally connected to said top rail.

14. The device of claim 13, wherein said angle of said threaded bolt provides a uniform counterbalancing force to support the computer component through the entire vertical adjustment range of said four bar linkage.

15. The device of claim 13, wherein said pivotable arm mount bracket further comprises a mechanical indexing structure to provide for incremental azimuthal adjustment.

16. The device of claim 15, wherein said azimuthal adjustment ranges from 7.5 to 15 degrees.

17. The device of claim 13, wherein a stop arm attached to said pivot bearing mount bracket extends through a rectangular hole in said bottom rail to provide a limit to the downward movement of said four bar linkage.

18. The device of claim 13, wherein said sliding member engages said threaded bolt at a location along said threaded bolt to support the computer component.

19. The device of claim 18, wherein said threaded bolt is adjusted by rotation to move said inboard end of said gas spring to apply appropriate tension in said gas springs to suspend the computer component.

20. The device of claim 18, wherein the computer component ranges in weight from 25 to 100 pounds.

* * * * *